(12) United States Patent
Wette

(10) Patent No.: US 7,699,710 B2
(45) Date of Patent: Apr. 20, 2010

(54) REINFORCED ROLLING BOOT

(75) Inventor: Joachim Wette, Hennef (DE)

(73) Assignee: GKN Driveline International, GMBH, Lohmer (DE)

( * ) Notice: Subject to any disclaimer, the term of this patent is extended or adjusted under 35 U.S.C. 154(b) by 0 days.

(21) Appl. No.: 12/099,122

(22) Filed: Apr. 7, 2008

(65) Prior Publication Data

US 2008/0254905 A1  Oct. 16, 2008

Related U.S. Application Data

(63) Continuation of application No. 11/024,276, filed on Dec. 28, 2004, now Pat. No. 7,354,349.

(30) Foreign Application Priority Data

Jan. 2, 2004 (WO) ............... PCT/EP2004/000003
Jul. 19, 2004 (DE) ....................... 10 2004 034 772

(51) Int. Cl.
  *F16D 3/84* (2006.01)
(52) U.S. Cl. ..................................... 464/173; 464/906

(58) Field of Classification Search ......... 464/173–175; 277/635, 636; 403/50, 51
See application file for complete search history.

(56) References Cited

U.S. PATENT DOCUMENTS

| 2,304,732 A | * | 12/1942 | Flumerfelt | ................ 403/51 X |
| 3,468,171 A | * | 9/1969 | Macielinski | ............ 464/173 X |
| 4,003,667 A | * | 1/1977 | Gaines et al. | ........... 277/635 X |
| 6,439,795 B1 | * | 8/2002 | Lavery et al. | ........... 464/173 X |
| 6,582,146 B2 | * | 6/2003 | Raymoure | .................... 403/50 |

* cited by examiner

*Primary Examiner*—Greg Binda
(74) *Attorney, Agent, or Firm*—Rader, Fishman & Grauer, PLLC

(57) ABSTRACT

A sealing sleeve (11) of the rolling boot type having a first larger, substantially cylindrical collar (12), a second smaller, substantially cylindrical collar (13), as a well as a wall portion (14) which is positioned between the collars (12, 13) and which forms at least one axially open annular fold (15) with circumferentially distributed indentations (18) in the convex curvature of the axially open annular fold (15), or with radial ribs (21) in the concave inner curvature of the axially open annular fold.

9 Claims, 6 Drawing Sheets

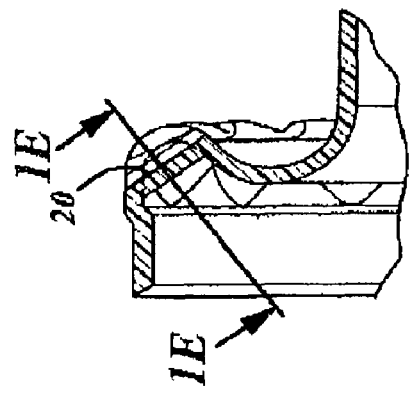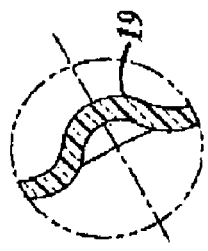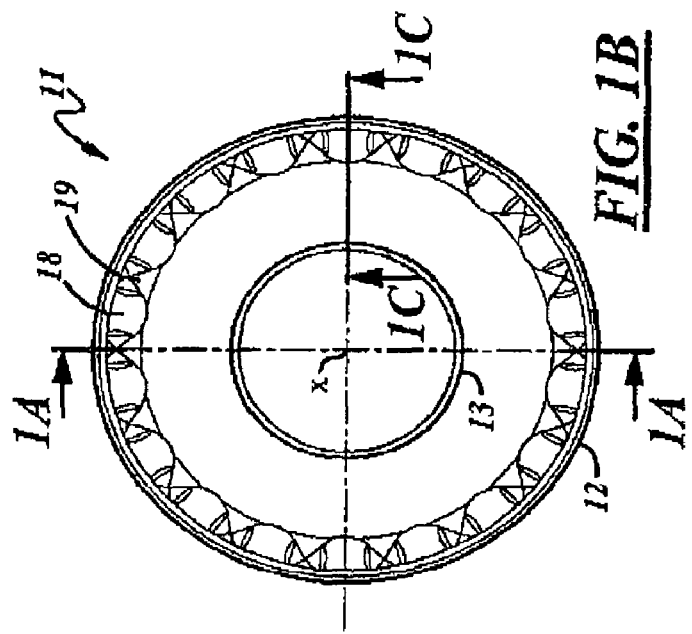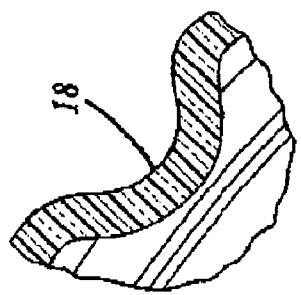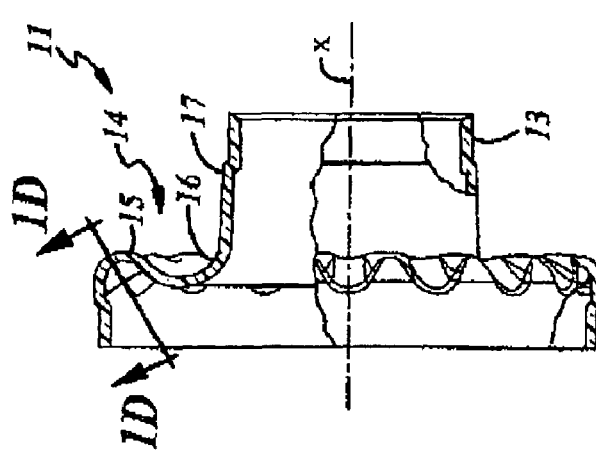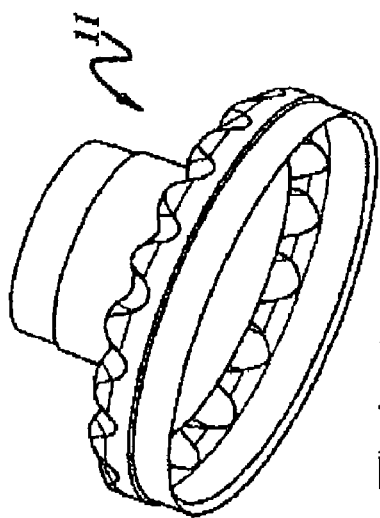

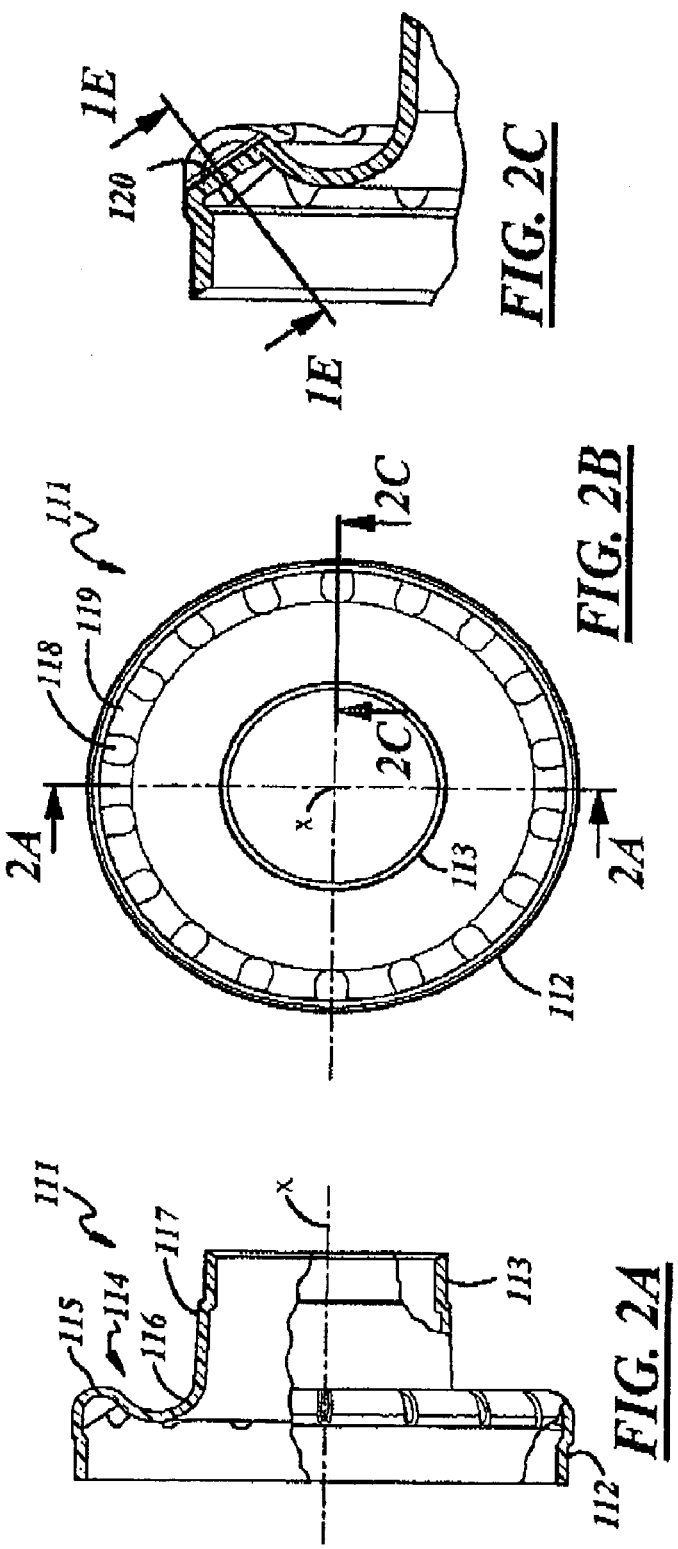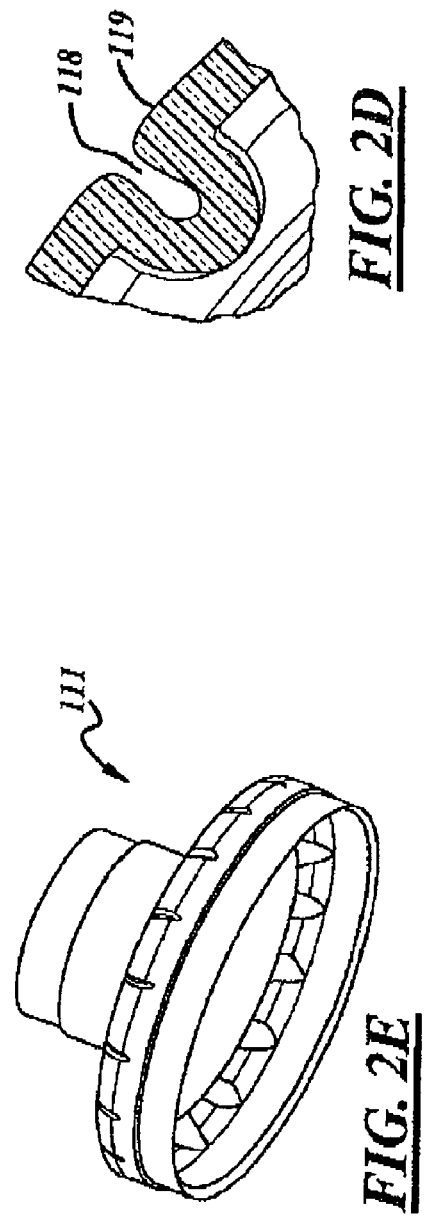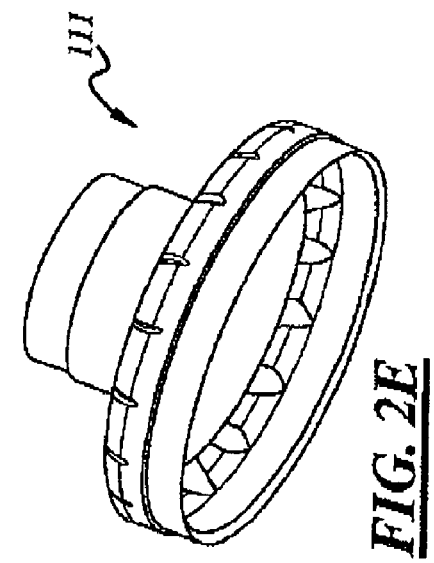

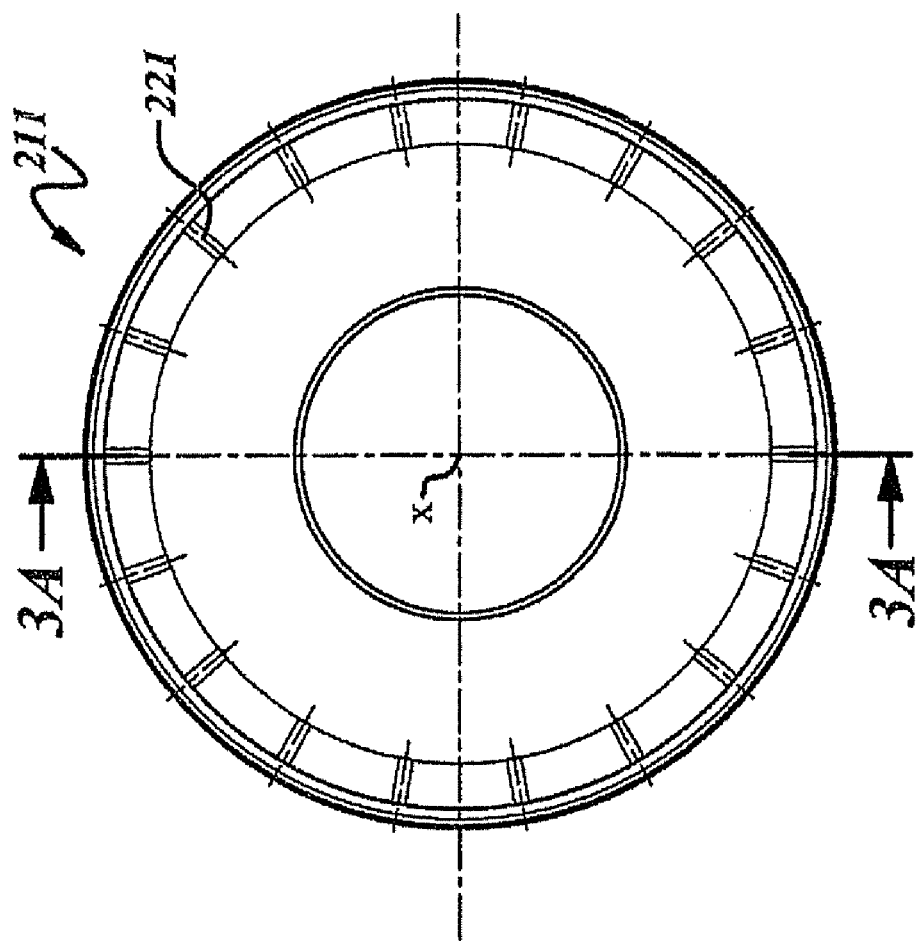
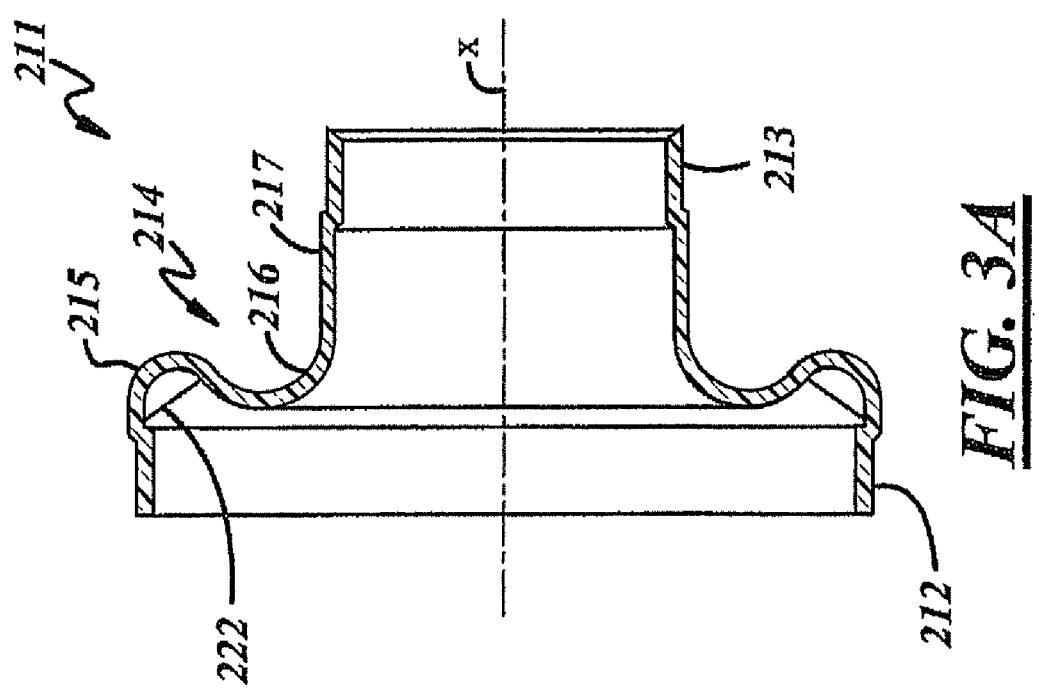
FIG. 3B
FIG. 3A

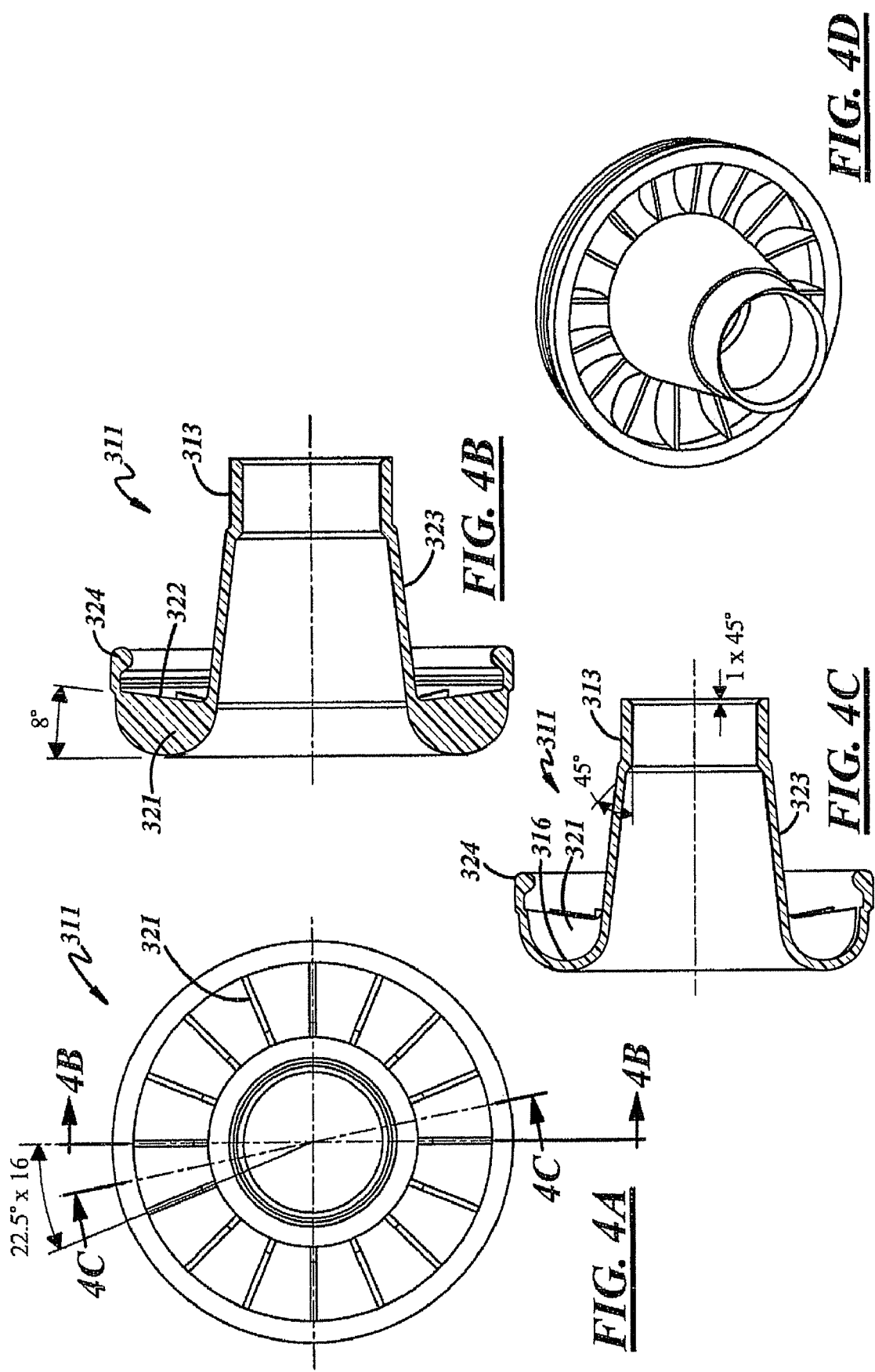

REINFORCED ROLLING BOOT

CROSS-REFERENCE TO RELATED APPLICATIONS

This application is a continuation of application Ser. No. 11/024,276 filed on Dec. 28, 2004, now U.S. Pat. No. 7,354,349 issued on Apr. 8, 2008. No new matter has been added.

TECHNICAL FIELD

The invention relates to a sealing sleeve in the form of a rolling boot, having a first larger, substantially cylindrical collar, a second smaller, substantially cylindrical collar as well as a wall portion having at least one axially open annular fold. Sleeves of this type are frequently used for sealing constant velocity joints wherein the first collar is connected to an outer joint part or to an annular plate metal cap connected to such an outer part and wherein the second collar is fixed to a shaft connected to an inner joint part. For positioning and fixing purposes, tensioning strips are typically applied to the outside of the collars.

BACKGROUND OF THE INVENTION

From U.S. Pat. No. 4,456,269, there is known a sealing sleeve of the foregoing type wherein a radial disc portion and cylindrical portion are arranged between a first collar secured to an outer joint part and an axially open annular fold. The two portions are reinforced relative to one another by circumferentially distributed radial ribs. Inside the cylindrical portion, there are positioned circumferentially distributed projections which serve as stops relative to the outer joint part.

EP 1 048 864 A2 describes a sealing sleeve wherein a first collar which is to be beaded into an annular plate metal cap is provided with circumferentially distributed notches for increasing its resilience.

Such prior art rolling boots have disadvantages when used in high speed applications. High speeds can result in the boot being expanded or the boot bursting under the influence of the centrifugal forces acting on the grease filling in the rolling boot. Thus, there exists a need for an improved rolling boot suitable for use in high speed applications.

SUMMARY OF THE INVENTION

The present invention provides a sealing sleeve in the form of a rolling boot having a high degree of dimensional stability, particularly at increased operating speeds, and which is easy to produce.

A first embodiment provides a sealing sleeve in the form of a rolling boot with the above-mentioned features which is characterised by circumferentially distributed indentations in the convex curvature of the at least one axially open annular fold. In this example, the wall thickness in the region of the axially open annular fold is substantially constant. Such an inventive sealing sleeve can advantageously be produced from thermoplastic elastomer in a blow molding process or an injection molding process. Because of the uniform wall thickness, a high degree of flexibility is achieved when the convoluted boot is articulated, ie. when the two collars are articulated relative to one another.

According to another example of the first embodiment, the base lines of the indentations are positioned on a cone which opens from the small collar to the large collar. According to a further embodiment, the at least one axially open annular fold directly adjoins the first collar and is convex towards the outside of the rolling boot. According to an advantageous additional feature, a further axially open annular fold adjoins the first annular fold and is concave towards the outside of the rolling boot. However, a reversal is also possible in that the first axially open annular fold with indentations is outwardly concave, with its wall extending more closely to the second smaller collar and that a second outwardly convex axially open annular fold without indentations adjoins the annular fold mentioned first and is positioned more closely to the first larger collar. According to a particularly advantageous embodiment, the larger collar is slipped directly on to the outer joint part of a sealed constant velocity joint, i.e. there is no need to use an annular plate metal cap between the sealing sleeve and the outer joint part.

According to a modified embodiment, only one single axially open annular fold with indentations is provided which is concave towards the outside of the rolling boot, with the first collar being fixed by way of an annular plate metal cap to an outer joint part.

Depending on the production method, the indentations, in a section extending perpendicularly to their base line, can form a wider U-shape with diverging arms or a narrow U-shape with parallel arms. Diverging arms can be created by blow molding, and parallel arms can be created by injection molding.

According to a second embodiment, a rolling boot sealing sleeve is provided which is characterised by circumferentially distributed radial ribs in the concave inner curvature of the at least one axially open annular fold. More particularly, the wall thickness in the region of the annular fold can be substantially constant. Such an inventive sealing sleeve can, advantageously, be produced from a thermoplastic elastomer by an injection molding method. Due to the preferably uniform wall thickness, there is ensured a high degree of flexibility when the convoluted boot is articulated, i.e. when the two collars are articulated relative to one another.

According to another example of the second embodiment, the head lines of the ribs are positioned on a cone which opens from the small collar to the large collar. In a further example, the at least one axially open annular fold provided with ribs directly adjoins the first collar and is convex towards the outside of the rolling boot. According to an advantageous additional feature, a further axially open annular fold adjoins the first annular fold and is concave towards the outside of the rolling boot. However, a reversal is also possible in that the first axially open annular fold with ribs is concave towards the outside and, in the region of the wall, is positioned more closely to the second smaller collar and that a second outwardly convex axially open annular fold without ribs adjoins the annular fold mentioned first and is positioned more closely to the first larger collar. In this embodiment, too, in a particularly advantageous application, the larger collar is slipped directly on to the outer joint part of a sealed constant velocity joint, i.e. there is no need to use an annular plate metal cap between the sealing sleeve and the outer joint part.

According to a modified embodiment, it is also possible to provide one single axially open annular fold which is concave towards the outside of the rolling boot and which, in its concave inner curvature, is reinforced by ribs.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows an inventive rolling boot with two annular folds in a first embodiment:
 A) in a longitudinal section 1A-1A according to FIG. 1B;
 B) in an axial section;
 C) in the form of an enlarged detail of the longitudinal section 1C-1C according to FIG. 1B;
 D) in a tangential or cylindrical section (portion) 1D-1D according to FIG. 1A;
 E) in a tangential or cylindrical section (portion) 1E-1E according to FIG. 1C; and
 F) in an Isometric view.

FIG. 2 shows an inventive rolling boot with two annular folds in a second embodiment:
 A) in a longitudinal section 2A-2A according to FIG. 2B;
 B) in an axial section;
 C) in the form of an enlarged detail of the longitudinal section 2C-2C according to FIG. 2B;
 D) in a tangential or cylindrical section (portion) 2E-2E according to FIG. 2C; and
 E) in an isometric view.

FIG. 3 shows an inventive rolling boot with two annular folds in a third embodiment:
 A) in a longitudinal section 3A-3A according to FIG. 3B; and
 B) in an axial view.

FIG. 4 shows an inventive rolling boot with an annular fold:
 A) in an axial view;
 B) in a longitudinal section 4B-4B according to illustration FIG. 4A;
 C) in a longitudinal section 4C-4C according to illustration FIG. 4A; and
 D) in an isometric view.

DETAILED DESCRIPTION OF THE DRAWINGS

Figure 5:
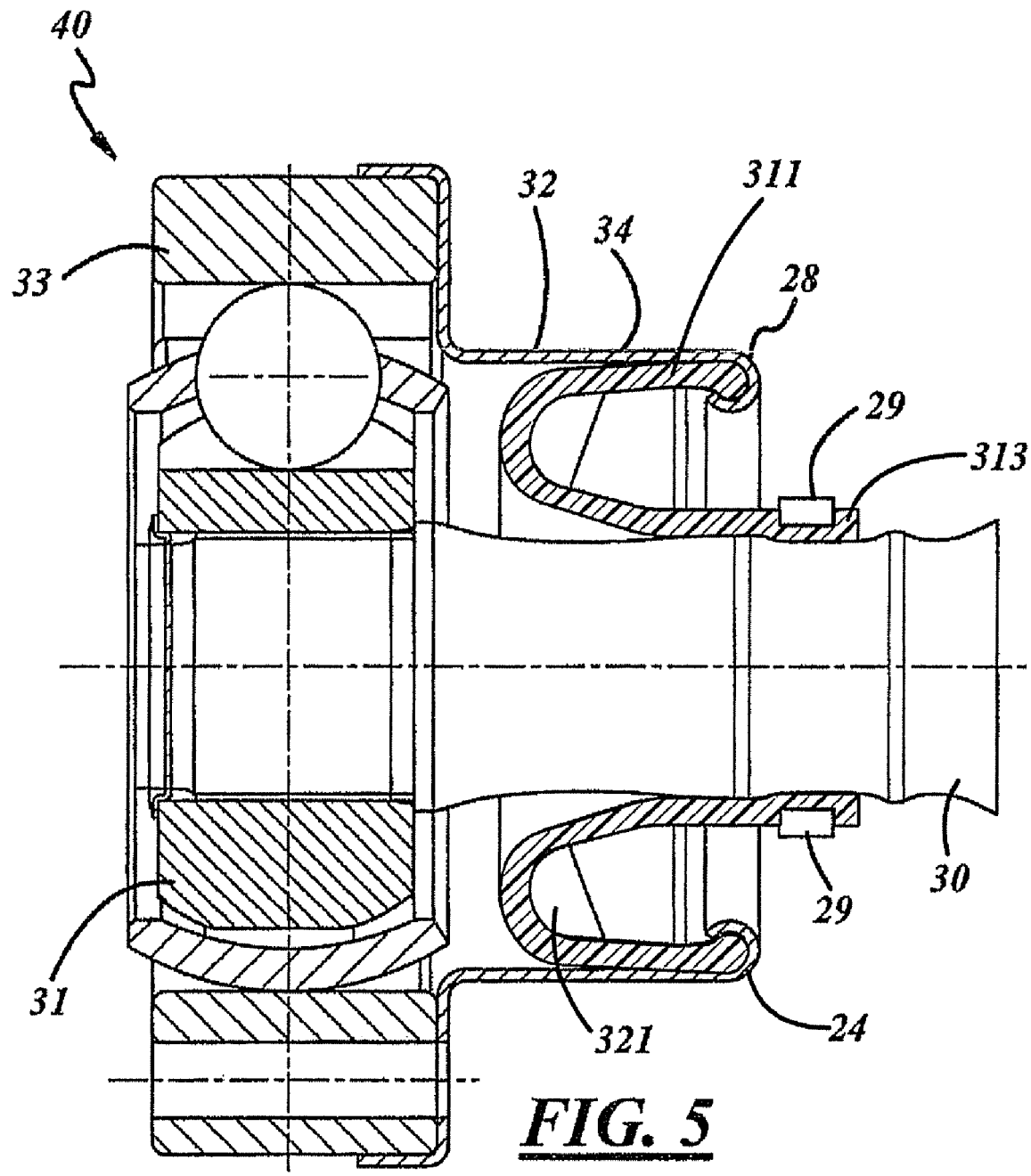
FIG. 5 shows a longitudinal sectional view of a rolling boot according to one embodiment of the present invention in an exemplary joint assembly.

While the present invention is described with respect to a rolling boot for sealing a constant velocity joint assembly, the present invention may be adapted and utilized for other applications including telescoping shaft assemblies and other articulating rotating connections. In the following description, various parameters are described for several constructed embodiments. These specific parameters, components or applications are included as examples and are not meant to be limiting.

Referring now to the drawings wherein like reference numerals are used to identify similar components in the various views, FIG. 1 illustrates a rolling boot with two annular folds according to a first embodiment. The individual illustrations of FIG. 1 will be described jointly. A rolling boot 11 with a longitudinal axis X comprises a first larger, substantially cylindrical collar 12, a second smaller, substantially cylindrical collar 13 and an annular wall 14 connecting same. The first collar 12 can be slipped on to an outer joint part and the second collar 13 on to a shaft inserted into an inner joint part. The annular wall 14 comprises a first axially open annular fold 15 which directly adjoins the first collar 12 and is outwardly convex, as well as a second axially open annular fold 16 which adjoins the first annular fold 15 and which is outwardly concave. The wall thickness in the regions of the annular folds 15, 16 can be substantially constant. Between the second annular fold 16 and the second collar 13, there extends a cylindrical portion 17. The two annular folds 15, 16 adjoin one another uniformly such that the tangents at the annular wall 14, in the region of transition, form a cone which opens from the first collar 12 to the second collar 13. In the first annular fold 15, when viewed from the outside, there are formed circumferentially distributed indentations 18 between which there remain bead portions 19. In the tangential section, the indentations 18 form U-shaped troughs, with the opening angle of the "arms" forming the U-shape ranging around 90°. A skilled artisan would appreciate that the indentations 18 form a U-shape with diverging arms. As a result of the uniform transitions from the trough to the bead portions 19, the latter, in the tangential section, also appear as U-shaped curvatures. The base lines 20 of the troughs are positioned on a surface which opens, i.e, extends radially outwardly, from the smaller collar 13 to the larger collar 12. One example of a base line 20 is shown in FIG. 1C which is illustrated as being inclined. A skilled artisan would comprehend that the base line 20 is the bottom of the trough that extends linearly in an inclined manner.

The individual illustrations of FIG. 2 will also be described jointly. A second exemplary embodiment to a rolling boot 111 is illustrated in FIGS. 2A-2E. In FIG. 2, the rolling boot 111 with a longitudinal axis X comprises the first larger, substantially cylindrical collar 112, the second smaller, substantially cylindrical collar 113 and the annular wall 114 connecting same. The annular wall 114 comprises the first axially open annular fold 115 which directly adjoins the first collar 112 and is outwardly convex, as well as a second axially open annular fold 116 which adjoins the first annular fold 115 and which is outwardly concave. Between the second annular fold 116 and the second collar 113, there extends the cylindrical portion 117. The two annular folds 115, 116 adjoin one another uniformly such that the tangents at the annular wall 114, in the region of transition, form a cone which opens from the first collar 112 to the second collar 113. In the first annular fold 115, there are formed circumferentially distributed indentations 118 between which there remain bead portions 119. In the tangential section, the indentations 118 form U-shaped troughs whose "arms" extend substantially parallel relative to one another. A skilled artisan would appreciate that the indentations 118 form a U-shape with parallel arms. The base lines 120 of the troughs are positioned on a surface which opens from the smaller collar 113 to the larger collar 112.

The individual illustrations of FIG. 3 will also be described jointly below. A third exemplary embodiment of a rolling boot 211 is illustrated in FIGS. 3A-3B. FIG. 3 shows the rolling boot 211 with a longitudinal axis X comprising the first larger, substantially cylindrical collar 212, the second smaller, substantially cylindrical collar 213 and the annular wall 214 connecting same. The annular wall 214 comprises a first axially open annular fold 215 which directly adjoins the first collar 212 and is outwardly convex, as well as a second axially open annular fold 216 which is outwardly concave. The wall thickness in the regions of the annular folds 215, 216 which adjoins the first annular fold 215 and can be substantially constant. Between the second annular fold 216 and the second collar 213, there extends the cylindrical portion 217. The two annular folds 215, 216 adjoin one another uniformly such that the tangents at the annular wall 214, in the region of transition, form a cone which opens from the first collar 212 to the second collar 213. In the first annular fold 215, on its inside, there are provided circumferentially distributed radial ribs 221. The head lines 222 of the ribs 221 are positioned on a surface which opens from the smaller collar 213 to the larger collar 212.

The individual illustrations of FIG. 4 will also be described jointly below. A fourth exemplary embodiment to a rolling boot 311 is illustrated in FIGS. 4A-4D. The rolling boot 311 with a longitudinal axis X comprises a first layer, the annular collar 312 in the form of an annular bead 324 which, for fixing purposes, can be rolled into a plate metal cap, the second, smaller substantially cylindrical collar 313 as well as the annular wall 314 which connects the two parts and which forms a single axially open annular fold 316 which is concave towards the outside. The wall thickness in the region of the annular fold 316 can be substantially constant. In the annular fold 316, there are provided sixteen circumferentially distributed radial ribs 321 whose head lines 322 are positioned on a surface, the point of which extends away from the collar 313. Between the collar 313 and the annular fold 316, there extends a conical portion 323. The collar 313, on its inside, comprises conical inclinations of about 45° to be able to engage an annular groove. Of course, although sixteen ribs 321 are shown in this example, fewer or more ribs could be used depending upon the particular application under consideration.

In the foregoing examples, the rolling boot embodiments having indentations can advantageously be produced by blow-molding, whereas the embodiments including ribs may be advantageously produced by injection molding.

FIG. 5 shows a longitudinal sectional view of the rolling boot 311 according to the embodiment of FIG. 4 in an exemplary joint assembly. The rolling boot 311 is shown sealing a joint 40. The rolling boot 311 is fixed by a clamp 29 at the second collar 13 to a shaft 30 of the joint 40, and is fixed by a crimped portion 28 at the annular bead 24 to a cover 32. The shaft 30 is connected to the inner joint part 31 of the joint 40. The cover 32 is connected to the outer joint part 33 of the joint 40. The cover 32 is typically a plate metal cover. The inner joint part 31 is coupled to the outer joint part 33 by a plurality of torque transmitting balls held in a ball cage. Thus, the rolling boot 311 seals the joint 40. The present embodiment of joint 40 as shown is a constant velocity joint. Of course, a rolling boot according to the present invention could also be used to seal other constant velocity joint configurations and universal joint configurations. For example, the rolling boots of the embodiments shown in FIGS. 1-3, can be configured to sealingly engage the shaft 30 at the second collar 13, 113, 213 and sealingly engage the outer circumferential surface 34 of a similar cover 32 by way of a clamp such as clamp 29 around the cylindrical first collar 312. In another embodiment, shown in FIG. 6, the first collar 212 may be configured to sealingly engage an inner surface of a cover 32'. Alternatively, if the cover 32 is omitted, the first collar 312 can sealingly engage the outer cylindrical surface of the outer joint part directly. Other applications of the reinforced rolling boots described herein are also contemplated.

Figure 6:
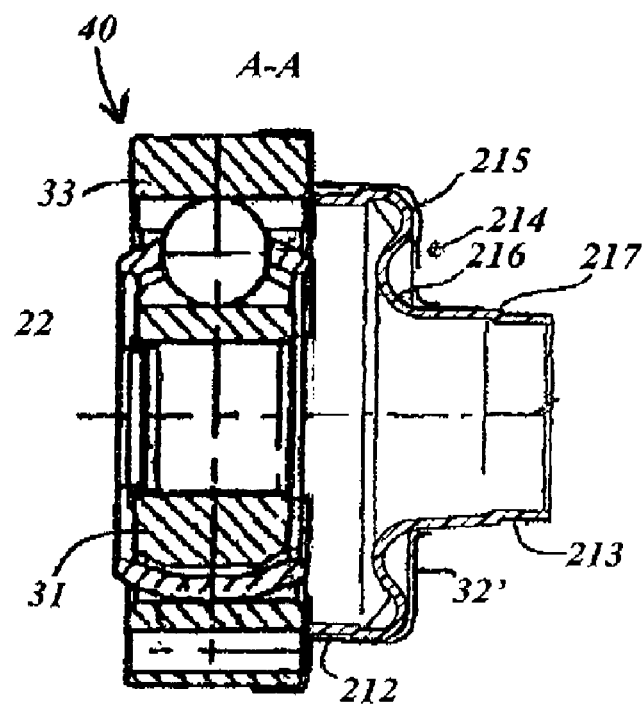
FIG. 6 shows a longitudinal section view of the rolling boot according to FIG. 1 connected to the exemplary joint assembly.

FIG. 6 illustrates the rolling boot 11 in FIG. 1 connected to the joint 40 described immediately above.

Figure 7:
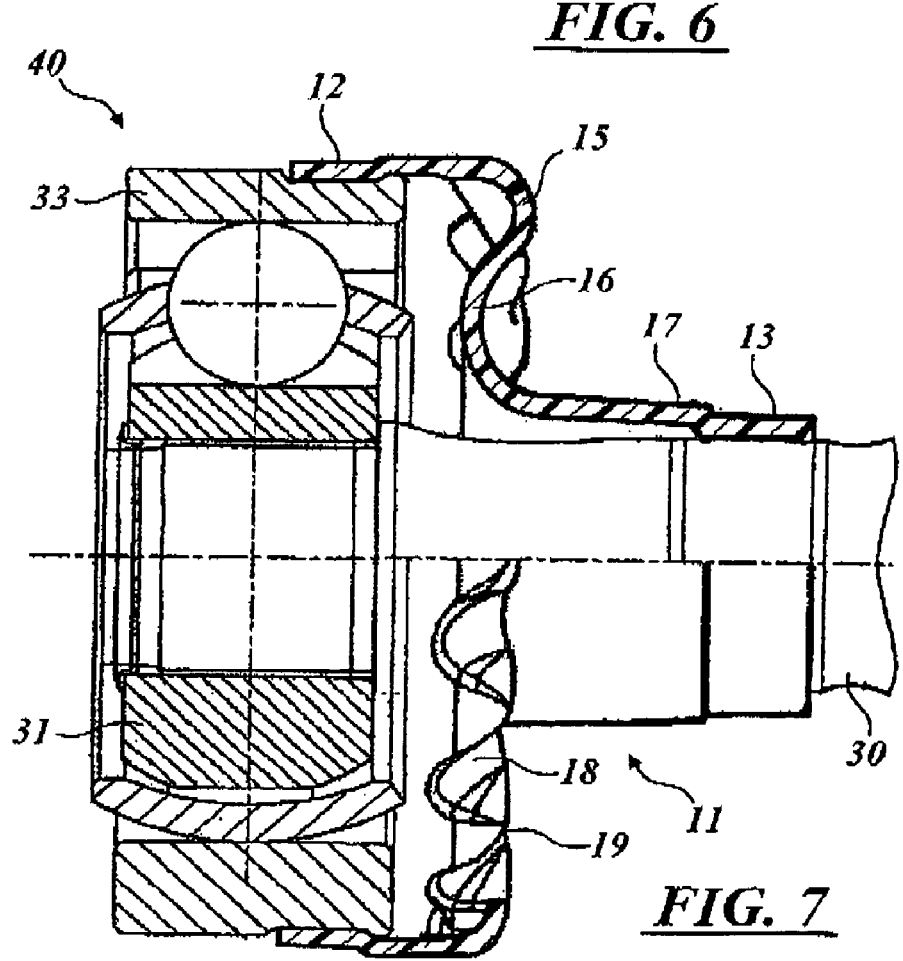
FIG. 7 shows a partially exposed longitudinal section view of the rolling boot according to FIG. 1 connected to the exemplary joint assembly.

FIG. 7 is a partially exposed longitudinal section view illustrating the rolling boot 11 in FIG. 1 connected to the joint 40 as described immediately above.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A sealing sleeve in the form of a rolling boot for sealing a constant velocity joint, said sealing sleeve comprising:
   a first larger, substantially cylindrical collar having a first axial extent for being connected to an outer joint part of said constant velocity joint;
   a second smaller, substantially cylindrical collar having a second axial extent for being connected to a shaft; and
   a non-perforated wall portion positioned between the first and second collars and forming a first axially open annular fold, which adjoins the first collar and is convex towards the outside of the rolling boot, and a second axially open annular fold which adjoins the first annular fold and is concave towards the outside of the rolling boot,
   wherein the first annular fold comprises a plurality of circumferentially distributed indentations, said indentations each forming a U-shape in cross section through the indentation and having a base line extending at an incline in a longitudinal section through the rolling boot.

2. A sleeve according to claim 1, wherein a wall thickness in the region of the first and second axially open annular folds is substantially constant.

3. A sleeve according to claim 1, wherein the first axially open annular fold directly adjoins the first collar.

4. A sleeve according to claim 1, wherein the second axially open annular fold adjoins the second collar and is concave towards the outside of the rolling boot.

5. A sleeve according to claim 1, wherein the sleeve is made by blow-molding or injection-molding.

6. A constant velocity joint comprising:
   an outer joint part;
   an inner joint part coupled to the outer joint part by a plurality of torque transmitting balls held in a ball cage;
   a shaft connected to the inner joint part; and
   a sealing sleeve according to claim 1 wherein the first collar sealingly engages the outer joint part and the second collar sealingly engages the shaft.

7. A constant velocity joint comprising:
   an outer joint part;
   an inner joint part coupled to the outer joint part by a plurality of torque transmitting balls held in a ball cage;
   a shaft connected to the inner joint part;
   a cover connected to the outer joint part; and
   a sealing sleeve according to claim 1 wherein the first collar sealingly engages the cover and the second collar sealingly engages the shaft.

8. A sealing sleeve in the form of a rolling boot for sealing a constant velocity joint, said sealing sleeve comprising:
   a first larger, substantially cylindrical collar having a first axial extent for being connected to an outer joint part of said constant velocity joint;
   a second smaller, substantially cylindrical collar having a second axial extent for being connected to a shaft; and
   a wall portion positioned between the first and second collars and forming a first axially open annular fold, which adjoins the first collar and is convex towards the outside of the rolling boot, and a second axially open annular fold which adjoins the first annular fold and is concave towards the outside of the rolling boot, wherein the first annular fold comprises a plurality of circumferentially distributed indentations, said indentations each forming a U-shape in cross section through the indentation and having a base line extending at an incline in a longitudinal section through the rolling boot, and wherein, in a cross-section extending approximately perpendicularly to the base lines, the indentations form the U-shape with diverging arms.

9. A sealing sleeve in the form of a rolling boot for sealing a constant velocity joint, said sealing sleeve comprising:

a first larger, substantially cylindrical collar having a first axial extent for being connected to an outer joint part of said constant velocity joint;

a second smaller, substantially cylindrical collar having a second axial extent for being connected to a shaft; and a wall portion positioned between the first and second collars and forming a first axially open annular fold, which adjoins the first collar and is convex towards the outside of the rolling boot, and a second axially open annular fold which adjoins the first annular fold and is concave towards the outside of the rolling boot, wherein the first annular fold comprises a plurality of circumferentially distributed indentations, said indentations each forming a U-shape in cross section through the indentation and having a base line extending at an incline in a longitudinal section through the rolling boot, and wherein, in a cross-section extending approximately perpendicularly to the base lines, the indentations form the U-shape with parallel arms.

* * * * *